United States Patent
Frisch

(10) Patent No.: US 6,322,371 B2
(45) Date of Patent: Nov. 27, 2001

(54) STEERING WHEEL

(75) Inventor: Ralph Frisch, Mömbris (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/828,059

(22) Filed: Apr. 6, 2001

(30) Foreign Application Priority Data

Apr. 19, 2000 (DE) .......................................... 200 07 239 U

(51) Int. Cl.[7] .................................................. H01R 39/00
(52) U.S. Cl. ............................................. 439/15; 439/352
(58) Field of Search .............................. 439/15, 164, 352

(56) References Cited

U.S. PATENT DOCUMENTS

| 4,700,794 | * | 10/1987 | Bernhagen et al. | 180/6.44 |
| 6,213,797 | * | 4/2001 | Best et al. | 439/164 |

FOREIGN PATENT DOCUMENTS

| 4436172 | 4/1996 | (DE) . |
| 19511410 | 10/1996 | (DE) . |
| 19924752 | 11/1999 | (DE) . |
| 2444744 | 8/1999 | (GB) . |
| 402045175 A | * 2/1990 | (JP) ..................................... 400/664 |

* cited by examiner

*Primary Examiner*—Khiem Nguyen
(74) *Attorney, Agent, or Firm*—Tarolli, Sundheim, Covell, Tummino & Szabo L.L.P.

(57) ABSTRACT

A steering wheel comprises a plug-in connector adapted to be inserted into a complementary plug-in connector for connecting a component mounted on the steering wheel, the plug-in connector being mounted at the steering wheel so as to be shiftable in a direction which corresponds to a direction of insertion of the plug-in connector. The steering wheel further comprises a flip-flop spring element which extends from the steering wheel to the plug-in connector. The spring element is able to assume a first stable position in which it biases the plug-in connector into an installation position, and a second stable position in which it biases the plug-in connector away from the complementary plug-in connector.

5 Claims, 2 Drawing Sheets

STEERING WHEEL

The invention relates to a steering wheel with a plug inserted into a complementary plug-in connector in order to connect a component mounted on the steering wheel.

BACKGROUND OF THE INVENTION

Such a steering wheel is known from German Utility Model No. 299 17 129. The plug-in connection consisting of the plug-in connector on the steering wheel and of the complementary plug-in connector that is mounted on the vehicle serves, for example, to connect the igniter of a gas generator for an airbag system. The plug-in connector on the steering wheel is designed in such a way that it is automatically inserted into the complementary plug-in connector when the steering wheel is installed in the vehicle. Furthermore, the plug-in connector on the steering wheel is mounted on the steering wheel in such a way that it can be shifted slightly so that tolerances can be compensated for when the steering wheel is turned. The plug-in connector mounted on the steering wheel and the complementary plug-in connector mounted on the vehicle theoretically rotate around the same axis, namely, the center axis of the steering shaft, however, even slight tolerances mean that the paths of movement of the two plug-in connectors are not completely concentric.

However, it has been found to be disadvantageous that the plug-in connectors mounted on the vehicle for the insertion of the plug-in connector mounted on the steering wheel cause the plug-in connector mounted on the steering wheel to remain under a residual force that impedes the free sliding movement of the plug-in connector on the steering wheel.

Thus, the objective of the invention is to improve a steering wheel of the type described above in such a way that the free sliding ability of the plug-in connector on the steering wheel after the installation is ensured.

BRIEF DESCRIPTION OF THE INVENTION

For this purpose, a steering wheel of the type described above is provided, which is characterized in that a flip-flop spring element is provided that extends from the steering wheel to the plug-in connector, the spring element being able to assume a first stable position in which it biases the plug-in connector into an installation position, and being able to assume a second stable position in which it biases the plug-in connector away from the complementary plug-in connector, and in that the plug-in connector is mounted on the steering wheel in such a way that it can be shifted in the insertion direction. When the steering wheel is installed in the vehicle, the spring element flips from the first stable position into the second stable position so that it exerts a force on the plug-in connector that counteracts the insertion force that is exerted during the installation. In this manner, the mechanical stress on the plug-in connector that results from the insertion force is eliminated and the plug-in connector can be shifted friction-free on the steering wheel when it is turned.

Advantageous embodiments of the invention can be found in the subordinate claims.

BRIEF DESCRIPTION OF THE DRAWINGS

The invention is described below with reference to a preferred embodiment that is shown in the appended drawings.

DETAILED DESCRIPTION OF THE INVENTION

Figure 1:
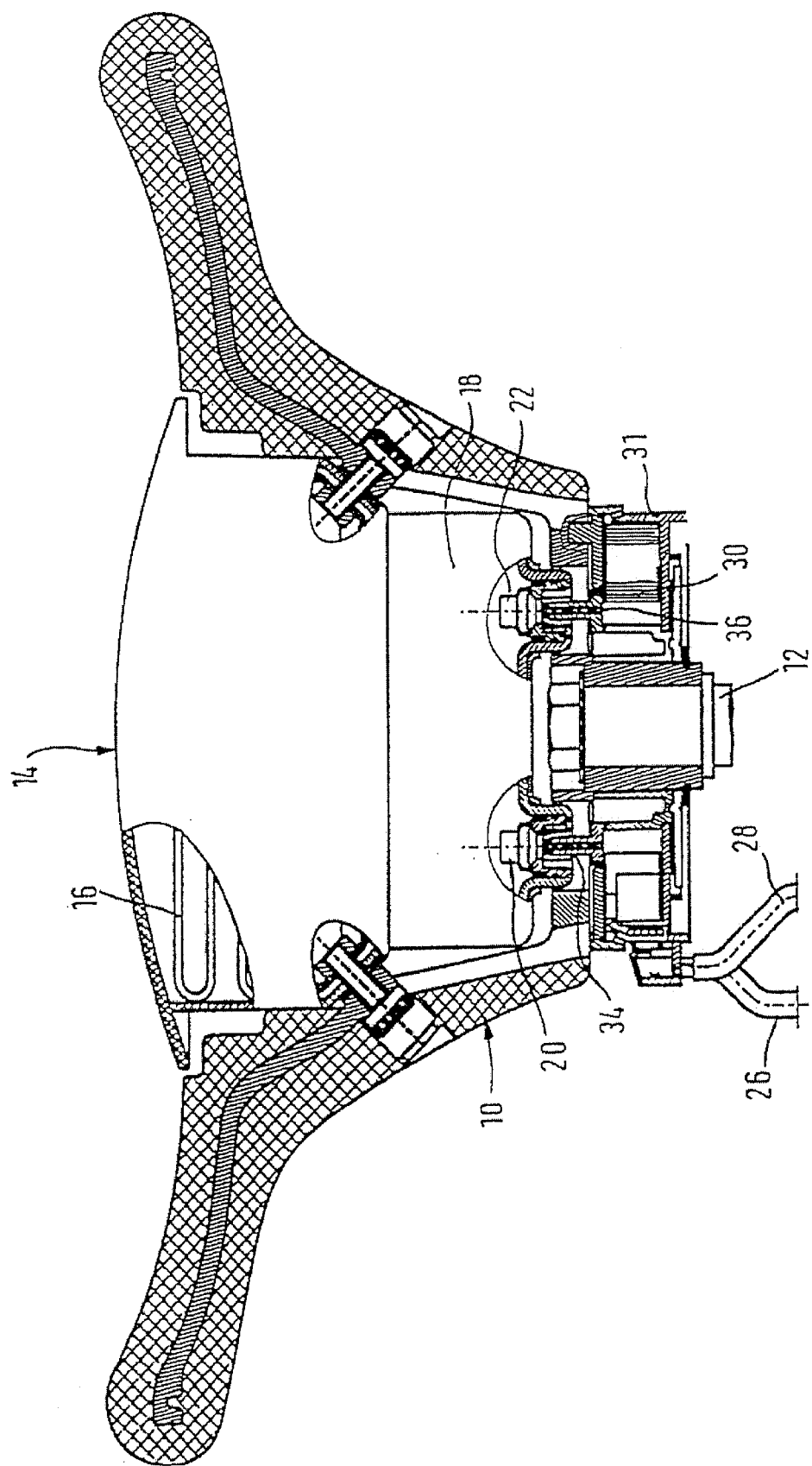
FIG. 1 a partial sectional view of a steering wheel according to the state of the art, FIG. 2 a schematic view of a part of the steering wheel according to the invention with the plug-in connector in an installation position FIG. 3 a view corresponding to that of FIG. 2 with the steering wheel during the installation.

FIG. 1 shows a vehicle steering wheel 10 that is connected to a steering shaft 12. The steering wheel has a gas bag module 14 consisting essentially of a gas bag 16 and a gas generator 18. The gas generator 18 here is a two-chamber gas generator with a first igniter 20 for the first chamber and a second igniter 22 for the second chamber. The igniters 20, 22 serve to ignite a gas-generating charge located in the chambers.

Two lines 26, 28 are provided on the vehicle in order to contact the two igniters 20, 22. Each line is connected with a helical-wound multipolar flat strip conductor cable 30 that constitutes an electrical connection between a fixed connection mounted on a vehicle part 31 for the lines 26, 28 and plug-in connections 34, 36 for the igniters 20, 22 that are provided on the steering wheel and thus turn along with it. The design of the plug-in connections 34, 36 is described in detail below with reference to FIG. 2.

Figure 2:
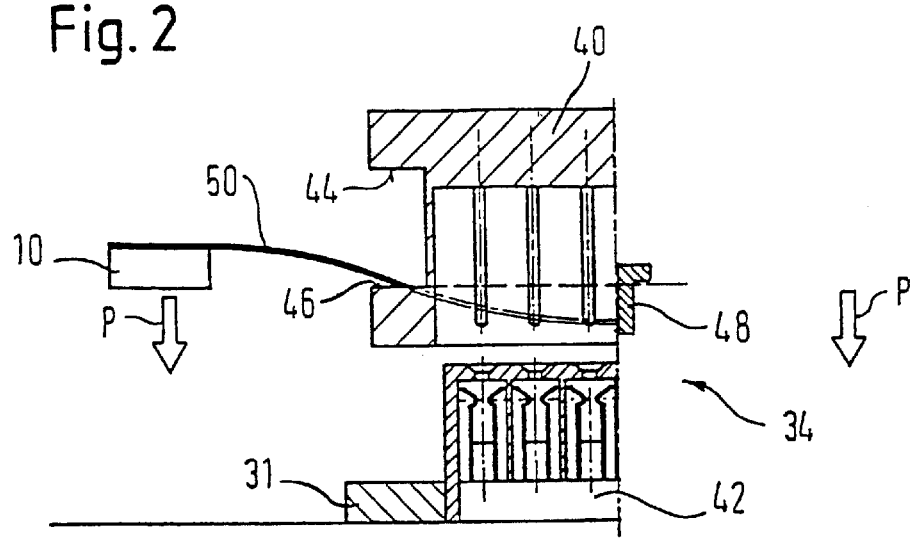

FIG. 2 shows an enlarged schematic view of the plug-in connection 34. It consists of a plug-in connector 40 that is mounted on the steering wheel 10 as well as a complementary plug-in connector 42 that is mounted on a vehicle part 31. The plug-in connector 40 that is mounted on the steering wheel 10 has two stops 44, 46 between which a sliding sleeve 48 is mounted in such a way that it can be shifted. A flip-flop spring element 50, which is configured here as a leaf spring, engages with the sliding sleeve. The leaf spring 50 extends from the sliding sleeve 48 to the steering wheel 10 on which it is held under tension at its appropriate end. FIG. 2 shows the leaf spring 50 in a first stable position in which it holds the plug-in connector 40 in an installation position and in which it biases the sliding sleeve 48 against the stop 46.

Figure 3:
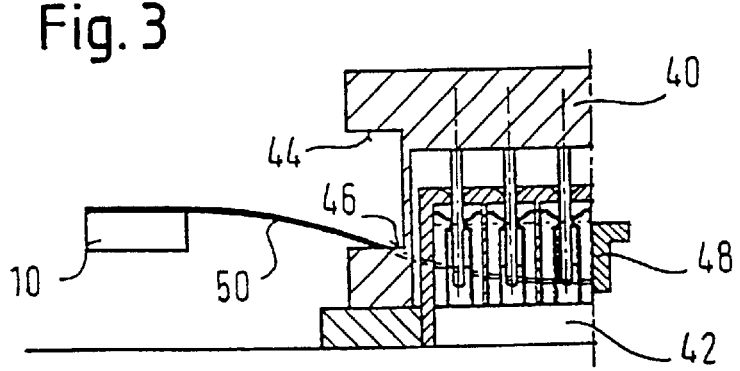
Figure 4:
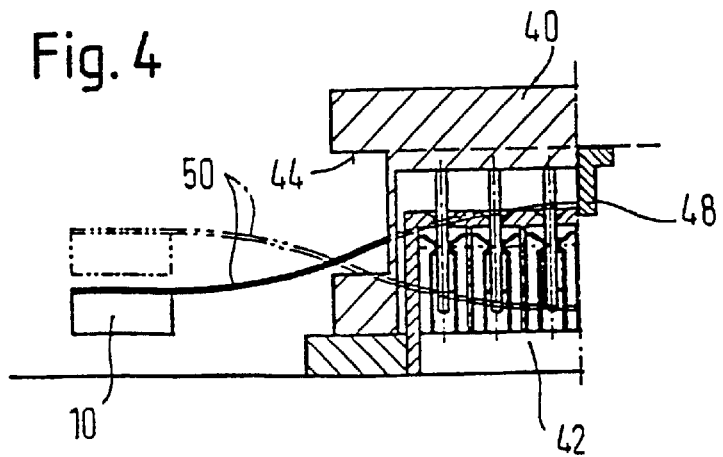
FIG. 4 a view corresponding to that of FIG. 2 after the installation of the steering wheel has been completed.

When the steering wheel 10 is installed in the vehicle, it is placed onto the steering shaft 12 in the direction of the arrow P. In this process, the plug-in connector 40 mounted on the steering wheel is positioned opposite the complementary plug-in connector 42 and is slid into the latter. The insertion force needed for this purpose is less than the force that would be necessary to move the leaf spring 50 from its first stable position beyond a dead center and into the second stable position. Thus, the plug-in connector 40 of the steering wheel 10 is inserted into the complementary plug-in connector 42 mounted on the vehicle via the leaf spring 50, the sliding sleeve 48 and the stop 46. This situation is shown in FIG. 3. It is important for both plug-in connectors to be completely inserted into each other before the steering wheel 10 is slid completely onto the steering shaft 12. As a result, after the plug-in connector 40 has been completely inserted into the complementary plug-in connector 42, the leaf spring 50 is slid further, thereby moving beyond its dead center and flipping over to its second stable position, which is shown in FIG. 4. As a result of the flipping over of the leaf spring 50, the sliding sleeve 48 moves from its position in which it lies against the stop 46 into a position in which it lies against the stop 44, that is to say, on the side facing away from the complementary plug-in connector 42 mounted on the vehicle. In order to illustrate this flipping over, in FIG. 4, the position drawn with solid lines, which corresponds to a completely installed steering wheel, is shown in comparison to the installation position, drawn with dotted lines, in which the two plug-in connectors are already completely inserted into each other.

When the leaf spring 50 is in the second stable position shown in FIG. 4, it biases the plug-in connector 40 via the sliding sleeve 48 and the stop 44 away from the complementary plug-in connector 42, which is mounted on the vehicle.

In order to compensate for position tolerances between the plug-in connector 40 mounted on the steering wheel and the complementary plug-in connector 42 mounted on the vehicle, the plug-in connector 40 is mounted onto the steering wheel 10 in a "floating" manner; in other words, it can be shifted in a plane perpendicular to the insertion direction. As a result of the force exerted on the plug-in connector 40 by the leaf spring 50 in its second stable position, frictional forces are eliminated that otherwise stem from the insertion force that is exerted during the installation and that can impair the ease of movement of the floating support.

What is claimed is:

1. A steering wheel comprising a plug-in connector adapted to be inserted into a complementary plug-in connector for connecting a component mounted on said steering wheel, said plug-in connector being mounted at said steering wheel so as to be shiftable in a direction which corresponds to a direction of insertion of said plug-in connector, and comprising a flip-flop spring element which extends from said steering wheel to said plug-in connector, the spring element being able to assume a first stable position in which it biases said plug-in connector into an installation position, and a second stable position in which it biases said plug-in connector away from said complementary plug-in connector.

2. The steering wheel of claim 1, wherein said spring element is a leaf spring.

3. The steering wheel of claim 1, wherein two spring elements are provided.

4. The steering wheel of claim 1, wherein said plug-in connector is provided with a sliding sleeve which can be shifted on said plug-in connector between two stops, said spring element engaging said sliding sleeve.

5. The steering wheel of claim 1, wherein said plug-in connector is mounted onto said steering wheel in such a way that it can be shifted in a plane perpendicular to said direction of insertion.

* * * * *